United States Patent Office 3,115,527
Patented Dec. 24, 1963

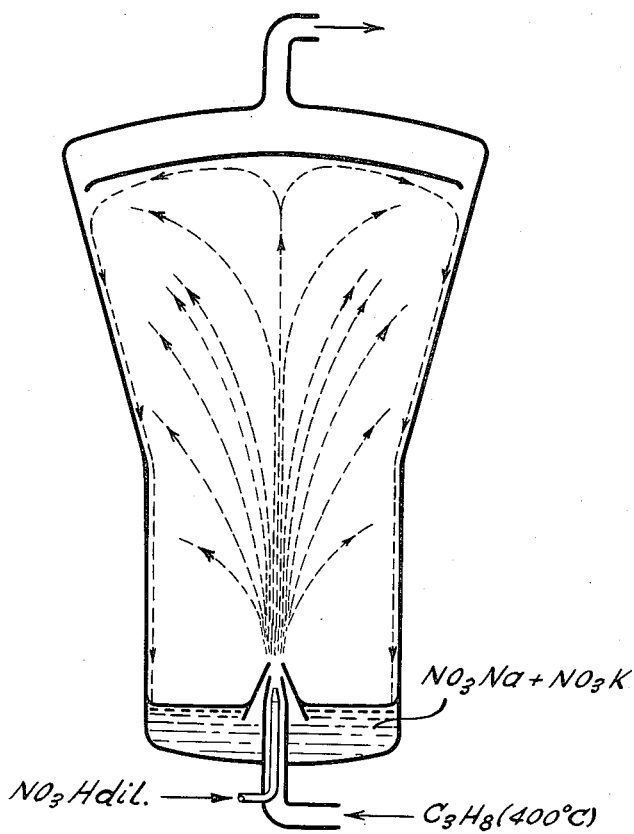

3,115,527
PROCESS FOR THE NITRATION OF ORGANIC COMPOUND IN GAS PHASE
Iosif Drimus, Gheorghe Claudiu Matasa, and Marcel Klang, all of Bucharest, Rumania, assignors to Ministerul Industriei Petrolului Si Chimiei, Bucharest, Rumania
Filed Oct. 25, 1960, Ser. No. 64,900
Claims priority, application Rumania Oct. 28, 1959
3 Claims. (Cl. 260—644)

The present invention deals with a process and an apparatus for obtaining the nitroderivates of organic substances by nitration in gas phase in the presence of a dispersion of molten salt drops.

The nitroderivates thus obtained, are more and more utilized as well as fuel, solvents or as intermediates for the organic synthesis.

The nitration of organic compounds is effected by several means; nitric acid of various concentrations, or gases containing nitrogen oxides are used as nitrating agents.

The reaction of nitration requires a thermic activation. These known processes include heating of the reactors at temperatures of over 300° C. The optimal temperature for given time of contact must be maintained in close intervals as its variations appreciably influence the conversion.

The use of nitrating agents at high temperatures raises very serious problems of corrosion. The material resisting under such conditions is stainless steel, which, however, has the disadvantage of negatively influencing the process, being a catalyzer of oxidation.

Owing to the fact that the nitrating agents also have an oxidizing effect, the nitration reaction is accompanied by one of oxidation which gives undesired products. In order to avoid this shortcoming, the majority of processes use the formation of a pellicle on the wall of the reactor, meant to mask the unwanted catalytic effect previously reported.

The pellicle is made up of mineral salts which are introduced by being dissolved into azotic acid.

Another important factor in the nitration of organic compounds is the mole ratio between the introduced reactants. The reaction occurs with violence at lower ratios of compounds respectively of the nitrated nitrating agent. Occasionally there may even take place explosions. If the mixture of the reactants happens under suitable conditions, the process may occur even in mole ratios equal to one unity.

The known nitration processes employ various types of reactors which aim to realize an efficacious control of the temperature, a good mixture of the reactants, and moreover to eliminate the catalytic effect of the walls of the reactor.

The tubular reactors succeed in maintaining the temperature within the convenient limits, only if they are used with an agent that ensures a high thermic transfer. This fact results in difficulties of realization and in a high consumption of stainless steel.

The processes which use a fluid bed obtain a high thermic transfer, but have a low productivity, because a good part of the volume of the reactor is filled with the solid suspension. The main disadvantage, however, is the fact that the particles erode the steel wall, thus increasing the corrosion and exposing the iron.

The processes which employ reactors of the chamber type have been found to be the most profitable and have been applied on an industrial scale. These reactors include an empty space with one or more entrances for the nitrating agent. According to the latter's concentration, the reactor can work in adiabatic regime as the reaction heat liberated by the exothermic reaction of the nitration equilibrates the evaporation heat and the losses due to transfer. The nitration agent, in this case nitric acid of 78 percent, is introduced in the form of a liquid jet by five entrances in the superposed reaction chambers. The ratio between the compound to be nitrated and the nitration agent must rigorously be maintained, because in the case of smaller ratios there occur ebullitions of the reaction or even explosions, for which cases there are provided steam inlets etc.

This type of reactor has a great output, the whole reaction space being occupied by the reactant; moreover, it provides savings of thermic energy. The process requires a vary strict control and a complicated installation; it is necessary to keep a temperature of over 400° C. in a reactor having a height of over 10 m. The evaporation of the azotic acid causes a decrease of the temperature of the reactor from 420 to 390 C., which attracts a gradient of high temperature that negatively influences the conversion. In order to contain the corrosive effect of the drops of nitric acid that fall on the hot metal and in order to prevent or reduce the reaction of the unwanted catalytic action of the iron, the reactor is lined inside with Pyrex glass or quartz.

A recent process partly solves these shortcomings by employing as reaction environment a mixture of molten salts in which is bubbled the nitrating agent in the form of vapors together with the compound to be nitrated.

The reaction takes place at the desired temperature without overheating; the mixture of the reactants occurs under good conditions. It is even possible to work on mole ratios—where the compound to be nitrated/nitrating agent equals to one. In the case of this process, the catalytic effect of the iron is unimportant. Yet, the output of the apparatus is small, for it is entirely filled with molten salts. The relatively great specific heat of the molten salts causes a high consumption of heat. Once the gases have left the salts, these must immediately be cooled in order to prevent the reaction to go on in the free space.

The molten salts carried off, solidify in this portion, diminish the thermic transfer very much and may obturate the pipe for the effluent gases.

This invention is concerned with a process and a nitration apparatus for the nitration of organic compounds in gas phase in reactors of the chamber type under conditions which avoid the shortcomings of other similar known processes.

According to the process, the reaction mixture made up by the organic compound to be nitrated, the nitrating agent with or without homogeneous catalysts in gas phase, meets at the lower part of where a vertical reactor a dispersion of molten salts takes place which causes a mixture and reaction. The reactor has at its basis a basin which contains a mass of molten salts which, once dispersed, cede their heat to the gases.

The dispersion of the salts may be obtained by one or more jets of the reactants in the gas phase and this in such a way that, in their ascendant movement, they carry off the salts. The dispersion can also be implemented by the recirculation of the molten salts from the base of the reactor towards its superior part, by well-known means (pumpts, etc.), from where they are pulverized, i.e., converted into a spray or mist, thanks to a system of ajutages, a turbine, an electromagnetic vibrator or by other means.

At the upper part of the reactor, is placed a device maintained at the reaction temperature; it separates the molten salts from the gas mixture. The separated salts, in liquid state, are led by the same device onto the walls of the reactor, on which they form a continuous film, after which they are collected in the basin located at the lower part of the reactor.

The effluent gases leave the reaction room, pass through a system of cooling and are then worked up under the usual conditions.

With the help of the process claimed in this invention, gaseous hydrocarbons may be nitrated, as well as volatile hydrocarbons and their oxidation or halogenation products, etc.

As nitrating agents there can be used nitric acid of various concentrations and gases containing nitric oxides with or without oxygen addings.

As salts there can be employed mineral salts, either alone or mixed. They have to be inert under the conditions of reaction and their melting point must be below the reaction temperature utilized in the process.

The working temperature is the one which is known. It ranges between 300 and 600° C. One can also work at atmospheric pressure or at a superior pressure up to 20 atm.

According to the process of the invention, the reactor does not require a glass jacket or other material as the unwanted catalytic action of the stainless steel walls is masked by a film of molten salts and the nitric acid enters the reactor in vaporised form.

The thermic transfer is much improved owing to the elimination of overheating. The thermic gradient in the reactor is reduced because the mixture of gases is uniformly heated.

The mixture of the compound to be nitrated with the nitrating agent takes place under good conditions; it eliminates violent reactions and the danger of explosions. This enables the leading of the reaction at lower molar to mole ratios of compound to be nitrated/nitrating agent.

There follow three examples concerning the application of the invention at the nitration of gaseous hydrocarbons, these being known to undergo nitration with the utmost difficulty.

*Example 1*

Preheated propane at 350° C. containing nitric acid in gas phase is injected by a system of ajutages in a cylindric stainless steel CrNi 18–8 reactor, carrying with it a molten mixture of potassium and sodium nitrate in equi-molecular ratio. The molten mixture of salts is to be found in a basin at the basis of the reactor, heated at a temperature of 450° C. The surface of the molten salt is at a convenient level so that the carrying off of the salts should take place. The reaction progresses in gas phase in the presence of the dispersion of the carried molten salts. The temperature in the reaction space is of 415° C., whereas the pressure is the atmospheric one.

The separating device of the upper part of the reactor is made up by a system of simple baffle walls, which detain, collect and lead the drops to the cylindric wall of the reactor, on which the salts flow down, returning into the basin.

The reaction mixture, thus free of salts, leaves the reactor and is further led into the ordinary condensation, cooling and separating system.

A reactor with a capacity of 2 l. containing 100 ml. of molten salts, fed in the mole ratio propane/nitric acid of 4/1, has an output of 8 kg. nitroalkanes in 24 hours at a contact time of 1.4 seconds.

Nitric acid is used in the form of an acid of 65% concentration; the utile conversion on a nitric acid basis is of 30 percent.

*Example 2*

In a stainless steel reactor of tronco-conical shape, having the large basis in the upper part, are introduced 665 normal liters of propane/l reactor an hour, the propane being preheated at 430° C., and 0.465 l. nitric acid/1 reactor an hour (concentration 50 percent in weight/$d_4^{15}$=1.318) by a coaxial injecting system which carries off a mixture of molten salts from a basin located at the basis of the reactor.

The mixture of salts has a composition in weight: 50 percent sodium nitrate and 50% potassium nitrate of technical purity, the melting point being over 180° C. The volume of the salts at the working temperature ($d_4^{400}$=1.85) is 1/10 of the total volume of the reactor.

The working pressure is the atmospheric one, the temperature in the reaction space 415° C., the mole ratio propane/nitric acid is 6.25/1, the time of contact 1.4 sec. (based on the reaction room free of salts). The gases which leave the reactor are condensed and cooled.

There are obtained condensed 0.147 kg. nitroalkanes/1 reactor an hour, with an average molecular weight 83, corresponding to a conversion of 36 percent based on nitric acid.

By calculating on the basis of the quantity of the effluent gases and the vapor pressure of the uncondensed quantity of nitroalkanes, the conversion of azotic acid in nitroalkanes is raised by another 4 percent. This provides a global utile conversion based on nitric acid of 40 percent per pass.

The quantity of formaldehyde obtained in the aqueous layer is of 16 gr./l. reactor an hour.

*Example 3*

In the reactor described in Example 2, are introduced 520 normal liters of propane/1 reactor an hour, preheated at 430° C., and 0.490 l. nitric acid/1 reactor an hour—concentration 50 percent in weight $d_4^{15}$=1.318.

The working pressure is the atmospheric one, the temperature in the reaction space 415° C., the mole ratio propane/nitric acid is 4.6/1, the time of contact 1.5 sec., the gases that leave the reactor are condensed and cooled.

One obtains condensed 0.142 kg. nitroalkanes/1 reactor an hour, having an average molecular weight of 83; this corresponds to a conversion of 33.5 percent based on nitric acid; the quantity of nitroalkanes carried off by the exit gases raises the conversion based on nitric acid by another 3 percent.

The quantity of formaldehyde obtained in the aqueous layer is of 30 gr./l. reactor an hour.

By applying the present invention, the following advantages may be obtained:

The use of lower mole ratios compound to be nitrate/nitrating agent, shorter times of contact because the gases reach sooner the reaction temperature thanks to the dispersion of the salts.

The use of simple reactors with an increased productivity.

The possibilities of the reaction getting out of control are avoided.

Although preferred examples of the invention have been described, it will be understood that modifications may be made within the spirit and scope of the appended claims. It will also be understood that there is no intention to include unmentioned ingredients other than minor impurities.

What we claim:

1. In a process for the vapor phase nitration of hydrocarbons in a reaction vessel having a bottom inlet and a top exit and wherein the nitration is effected with nitric acid and in the presence of molten salt, the improvement which comprises arranging said molten salt in said vessel as a bottom layer enclosing said bottom inlet and injecting said hydrocarbon and said nitric acid into said reaction vessel through said bottom inlet and said bottom layer of molten salt to obtain ascending interlaced jets composed of a mixture of nitric acid, hydrocarbon and molten salt.

2. The improvement of claim 1, wherein said hydrocarbon and said nitric acid are separately injected into said vessel.

3. The improvement of claim 1, wherein the path of said ascending jets is obstructed to separate molten salt therefrom and to hurl it against the walls of said vessel from where the salt flows back into said bottom layer.

References Cited in the file of this patent

UNITED STATES PATENTS

| | | |
|---|---|---|
| 2,260,258 | Martin | Oct. 21, 1941 |
| 2,761,768 | Diels et al. | Sept. 4, 1956 |
| 2,905,724 | Martin | Sept. 22, 1959 |
| 2,951,746 | Kouba et al. | Sept. 6, 1960 |

OTHER REFERENCES

"Chemical Engineers' Handbook," Perry, published by McGraw-Hill Book Co., New York (1950).